(12) United States Patent
Koarai

(10) Patent No.: US 10,019,659 B2
(45) Date of Patent: *Jul. 10, 2018

(54) IMAGE FORMING SYSTEM, DATA PROCESSING APPARATUS, IMAGE FORMING APPARATUS, RECORDING MEDIUM AND DISPLAY METHOD

(71) Applicant: Sharp Kabushiki Kaisha, Sakai, Osaka (JP)

(72) Inventor: Shoji Koarai, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/373,884

(22) Filed: Dec. 9, 2016

(65) Prior Publication Data

US 2017/0091984 A1 Mar. 30, 2017

Related U.S. Application Data

(60) Continuation of application No. 14/855,501, filed on Sep. 16, 2015, now Pat. No. 9,552,177, which is a (Continued)

(30) Foreign Application Priority Data

May 27, 2010 (JP) .................................. 2010-121852

(51) Int. Cl.
*G06K 15/00* (2006.01)
*G06F 3/12* (2006.01)
(Continued)

(52) U.S. Cl.
CPC ........... *G06K 15/00* (2013.01); *G06F 3/1208* (2013.01); *G06F 3/1256* (2013.01); *G06F 3/1285* (2013.01); *G06K 15/025* (2013.01); *G06T 15/205* (2013.01); *H04N 1/00233* (2013.01); *H04N 1/00442* (2013.01); *H04N 1/00448* (2013.01); *H04N 1/00453* (2013.01); *H04N 1/00466* (2013.01); *H04N 1/00482* (2013.01); *H04N 1/00506* (2013.01); *H04N 1/00222* (2013.01); *H04N 2201/0094* (2013.01)

(58) Field of Classification Search
None
See application file for complete search history.

(56) References Cited

U.S. PATENT DOCUMENTS 9,552,177 B2 * 1/2017 Koarai .................. G06F 3/1208
2007/0240042 A1 * 10/2007 Sato ...................... G06F 3/1208
715/209

(Continued)

OTHER PUBLICATIONS

Koarai, "Image Forming System, Data Processing Apparatus, Image Forming Apparatus, Recording Medium and Display Method", U.S. Appl. No. 14/855,501, filed Sep. 16, 2015.

*Primary Examiner* — Dov Popovici
(74) *Attorney, Agent, or Firm* — Keating & Bennett, LLP

(57) ABSTRACT

When an image formation instruction for created document data is received, image data for a preview image corresponding to the document data is generated, the preview image based on the image data is displayed on a display, and an image is formed using data for image formation based on the image data for the preview image.

19 Claims, 9 Drawing Sheets

Related U.S. Application Data continuation of application No. 14/172,698, filed on Feb. 4, 2014, now Pat. No. 9,165,221, which is a division of application No. 13/115,326, filed on May 25, 2011, now Pat. No. 8,675,242.

(51) Int. Cl.
*G06K 15/02* (2006.01)
*G06T 15/20* (2011.01)
*H04N 1/00* (2006.01)

(56) References Cited

U.S. PATENT DOCUMENTS

| | | | | |
|---|---|---|---|---|
| 2011/0317193 | A1* | 12/2011 | Iwase | G03G 15/234 358/1.13 |
| 2012/0036432 | A1* | 2/2012 | Mizoguchi | G06F 3/1208 715/274 |

* cited by examiner

IMAGE FORMING SYSTEM, DATA PROCESSING APPARATUS, IMAGE FORMING APPARATUS, RECORDING MEDIUM AND DISPLAY METHOD

CROSS-REFERENCE TO RELATED APPLICATION

This application is a continuation application of U.S. application Ser. No. 14/855,501, filed Sep. 16, 2015, issued as U.S. Pat. No. 9,552,177 on Jan. 24, 2017, which is a continuation application of U.S. application Ser. No. 14/172,698, filed Feb. 4, 2014, issued as U.S. Pat. No. 9,165,221 on Oct. 20, 2015. U.S. application Ser. No. 14/172,698 is a divisional application of U.S. Ser. No. 13/115,326, filed May 25, 2011, issued as U.S. Pat. No. 8,675,242 on Mar. 18, 2014. U.S. application Ser. No. 13/115,326 claims priority under 35 U.S.C. § 119(a) to Patent Application No. 2010-121852 filed in Japan on May 27, 2010. The entire contents of the above-identified applications are hereby incorporated by reference.

BACKGROUND

1. Technical Field

The present invention relates to an image forming system, a data processing apparatus, an image forming apparatus, and a computer program for displaying a preview image corresponding to created document data, or for an image formation based on the document data.

2. Description of Related Art

A printer driver is installed in a personal computer to enable an image forming apparatus, such as a printer and a multi-function printer, to perform an output (image formation) process for document data, such as text and image, (hereinafter referred to as the document data) created by a user on an application, which is activated on the personal computer.

When the user gives an instruction to output the document data created on the application, the printer driver is activated, converts the document data and output conditions into a form (PCL) capable of being processed and outputted by the image forming apparatus, and sends them to the image forming apparatus. The image forming apparatus receives the PCL type data and executes an image formation process for the document data according to the output conditions.

Further, before sending the document data to the image forming apparatus, the printer driver displays on a display section a setting screen for receiving settings of output conditions (such as the number of pages to be outputted, a paper specification, and post-processing settings) from the user, converts the output conditions received through the setting screen into the PCL form recognizable by the image forming apparatus, and sends them together with the document data.

However, in such a state, although the user can imagine what an output to be outputted from the image forming apparatus will look like, the user cannot visually recognize the output before being outputted.

Therefore, Japanese Patent Application Laid-Open No. H10-40045 (1998) discloses a print preview method that uses a printer driver to display the form of an output to be outputted from a printer on a display section of a personal computer so that the user is able to confirm the output in advance on the screen of the display section.

Japanese Patent Application Laid-Open No. H7-325693 (1995) discloses an information processing system including a printer driver that converts document data to be outputted into data for a preview compatible with a corresponding image forming apparatus and displays an image based on the converted data on a display section.

SUMMARY

However, the print preview method disclosed in Japanese Patent Application Laid-Open No. H10-40045 (1998) and a so-called preview display provided by the information processing system disclosed in Japanese Patent Application Laid-Open No. H7-325693 (1995) merely provide a simplified preview image created with using document data and do not enable a user to confirm the details of an output, and thus fail to sufficiently exhibit an intended function of a preview image which allows the user to view the final state of the output.

Further, with the advancement of high-performance image generating apparatuses providing high image quality, high resolution, etc., users who produce outputs using a high-performance image forming apparatus demand more realistic and detailed preview images that allow the users to confirm the images. The print preview method disclosed in Japanese Patent Application Laid-Open No. H10-40045 (1998) and a simplified preview image like a preview display provided by the information processing system disclosed in Japanese Patent Application Laid-Open No. H7-325693 (1995) fails to meet such demand of the users. Thus, even when an output is produced using a high-performance image forming apparatus, a preview image adequate for the high-performance image forming apparatus is not provided, and the user is not able to visually recognize the output in advance, and therefore there is a possibility that a wasteful output which does not meet the user's expectation may be outputted.

More specifically, in the print preview method disclosed in Japanese Patent Application Laid-Open No. H10-40045 (1998), a graphic instruction from a GDI (Graphic Device Interface) is displayed. In the information processing system disclosed in Japanese Patent Application Laid-Open No. H7-325693 (1995), original document data for printing is converted into a printer code and then the printer code is converted into preview data, or the document data is converted into preview data.

In the print preview method disclosed in Japanese Patent Application Laid-Open No. H10-40045 (1998), however, a preview image and a printed image do not always match. This is because even when the user modifies settings by the printer driver, the modification is not always reflected in the preview image.

In the information processing system disclosed in Japanese Patent Application Laid-Open No. H7-325693 (1995), when converting document data into preview data, a modification made in the settings by the printer driver is not always reflected in the preview image. In the case where the document data is converted into a printer code and then further converted into preview data, a modification in the settings is reflected in the preview image, but it is necessary to regenerate a printer code and preview data whenever a modification is made to the settings, and an increased number of processes are required.

The present invention has been made with the aim of solving the above problems, and it is an object of the invention to provide an image forming system, a data processing apparatus, an image forming apparatus, and a computer program, which in a case of receiving an image formation instruction for created document data, generate image data for a preview image corresponding to the document data and display a preview image based on the image data on a display section, and form an image using image formation data based on the image data for the preview image, and are thereby capable of displaying a preview image representing more realistically an output, improving the visibility for the user, and displaying a preview image adequate for the high-performance image forming apparatus.

Another object of the present invention is to provide an image forming system, a data processing apparatus, an image forming apparatus, and a computer program, which create image data for a preview image from document data, display a preview image based on the image data on a display section, receive settings of image forming conditions and post-image-formation processing conditions, modify the image data for the preview image based on the settings, and generate data for image formation based on the image data, and therefore do not need to regenerate image data for a preview image and data for image formation every time a modification is made to the settings of the image forming conditions and post-image-formation processing conditions, for example, and are thereby capable of promptly reflecting the modification in the image forming conditions and post-image-formation processing conditions in the preview image and displaying the preview image matching the image of an output.

The image forming system according to the present invention is an image forming system including a data processing apparatus for creating document data for an image to be formed and displaying a preview image corresponding to the document data on a display section, and an image forming apparatus for forming an image based on data acquired, wherein the data processing apparatus comprises: an instruction receiving section for receiving an image formation instruction for the document data; an image data generating section for generating image data for the preview image when the instruction receiving section receives the image formation instruction; an image display section for displaying the preview image based on the image data generated by the image data generating section on the display section; and a formation data generating section for generating, based on the image data for the preview image, data for image formation which is to be sent to the image forming apparatus, and the image forming apparatus comprises: an acquiring section for acquiring the data for image formation from the data processing apparatus; and an image forming section for forming an image based on the acquired data for image formation.

In the present invention, when the instruction receiving section of the data processing apparatus receives an image formation instruction for created document data, image data generating section of the data processing apparatus generates image data for a preview image corresponding to the document data, and image display section of the data processing apparatus displays a preview image based on the image data on the display section. In addition, formation data generating section of the data processing apparatus generates, based on the image data for the preview image, data for image formation that is to be sent to the image forming apparatus. The data for image formation is sent to the image forming apparatus. The acquiring section of the image forming apparatus acquires the data for image formation from the data processing apparatus, and the image forming section of the image forming apparatus forms an image based on the data for image formation acquired by the acquiring section.

The image forming system according to the present invention is an image forming system, wherein the image display section of the data processing apparatus comprises: a setting receiving section for receiving settings of image forming conditions for the document data and post-image-formation processing conditions; and a modifying section for modifying the image data for the preview image, according to the image forming conditions and post-image-formation processing conditions received by the setting receiving section, and displays a preview image based on the modified image data from the modifying section on the display section.

In the present invention, when the setting receiving section of the image display section receives settings of image forming conditions for the document data and post-image-formation processing conditions, the modifying section of the image display section modifies the image data for the preview image, according to the image forming conditions and post-image-formation processing conditions. The image display section displays a preview image based on the modified image data on the display section.

The image forming system according to the present invention is an image forming system, wherein the data processing apparatus further comprises a three-dimensional data generating section for generating three-dimensional image data for a preview image corresponding to stereoscopic viewing.

In the present invention, the three-dimensional data generating section generates three-dimensional image data for a preview image. The display section displays a preview image based on the three-dimensional image data on the display section.

The image forming system according to the present invention is an image forming system, wherein the formation data generating section generates data for image formation including the image forming conditions and post-image-formation processing conditions, according to an instruction from the image display section.

In the present invention, the formation data generating section of the data processing apparatus generates data for image formation including the image forming conditions and post-image-formation processing conditions received by the setting receiving section, and sends the data to the image forming apparatus.

The data processing apparatus according to the present invention is a data processing apparatus for creating document data for an image to be formed and displaying a preview image corresponding to the document data on a display section, comprising: an instruction receiving section for receiving an image formation instruction for the document data; an image data generating section for generating image data for the preview image when the instruction receiving section receives the image formation instruction; an image display section for displaying the preview image based on the image data generated by the image data generating section on the display section; and a formation data generating section for generating, based on the image data for the preview image, data for image formation.

In the present invention, when the instruction receiving section receives an image formation instruction for created document data, the image data generating section generates image data for a preview image corresponding the document data, and the image display section displays a preview image based on the image data on the display section. Moreover, the formation data generating section generates, based on the image data for the preview image, data for image formation.

The data processing apparatus according to the present invention is characterized by a data processing apparatus, wherein the image display section comprises: a setting receiving section for receiving settings of image forming conditions for the document data and post-image-formation processing conditions; and a modifying section for modifying the image data for the preview image, according to the image forming conditions and post-image-formation processing conditions received by the setting receiving section, and displays a preview image based on the modified image data from the modifying section on the display section.

In the present invention, when the setting receiving section receives the settings of image forming conditions for the document data and post-image-formation processing conditions, the modifying section of the image display section modifies the image data for the preview image, according to the image forming conditions and post-image-formation processing conditions, and the image display section displays a preview image based on the modified image data on the display section.

The data processing apparatus according to the present invention is a data processing apparatus, further comprising a three-dimensional data generating section for generating three-dimensional image data for a preview image corresponding to stereoscopic viewing.

In the present invention, the three-dimensional data generating section generates three-dimensional image data for a preview image, and the display section displays a preview image based on the three-dimensional image data on the display section.

The data processing apparatus according to the present invention is a data processing apparatus, wherein the formation data generating section generates data for image formation including the image forming conditions and post-image-formation processing conditions, according to an instruction from the image display section.

In the present invention, the formation data generating section generates data for image formation including the image forming conditions and post-image-formation processing conditions received by the setting receiving section.

The image forming apparatus according to the present invention is an image forming apparatus comprising: a data processing apparatus defined above; and an image forming section for forming an image based on document data created by the data processing apparatus on a sheet.

In the present invention, an image is formed on a sheet, based on document data created by a data processing apparatus and acquired from the data processing apparatus.

The recording medium according to the present invention is a non-transitory computer-readable recording medium readable by a computer and storing a computer program for causing a computer constituting a data processing apparatus, which includes a display section and creates document data for an image to be formed, to display a preview image corresponding to the document data, said computer program comprising: an instruction receiving step for causing the computer to receive an image formation instruction for the document data; an image data generating step for causing the computer to generate image data for the preview image when the image formation instruction is received; an image display step for causing the computer to display the preview image based on the image data generated in the image data generating step on the display section; and a formation data generating step for causing the computer to generate, based on the image data for the preview image, data for image formation.

The display method according to the present invention is a display method for use with a data processing apparatus, which includes a display section and creates document data for an image to be formed, to display a preview image corresponding to the document data, comprising: an instruction receiving step for receiving an image formation instruction for the document data; an image data generating step for generating image data for the preview image when the image formation instruction is received; an image display step for displaying the preview image based on the image data generated in the image data generating step on the display section; and a formation data generating step for generating, based on the image data for the preview image, data for image formation.

In the present invention, when an image formation instruction for created document data is received, image data for a preview image corresponding to the document data is generated, and a preview image based on the image data is displayed on the display section. In addition, data for image formation based on the document data is generated, and a given image forming apparatus forms an image by using the data for image formation.

The recording medium according to the present invention is a non-transitory computer-readable recording medium readable by a computer, wherein said computer program further comprises: a setting receiving step for causing the computer to receive settings of image forming conditions for the document data and post-image-formation processing conditions; a modifying step for causing the computer to modify the image data for the preview image, according to the image forming conditions and post-image-formation processing conditions received in the setting receiving step, and a step for causing the computer to display a preview image based on the modified image data in the modifying step on the display section.

The display method according to the present invention is a display method, further comprising: a setting receiving step for receiving settings of image forming conditions for the document data and post-image-formation processing conditions; a modifying step for modifying the image data for the preview image, according to the image forming conditions and post-image-formation processing conditions received in the setting receiving step, and a step of displaying a preview image based on the modified image data in the modifying step on the display section.

In the present invention, when settings of image forming conditions for the document data and post-image-formation processing conditions are received, the image data for a preview image is modified based on the image forming conditions and post-image-formation processing conditions, and a preview image is displayed based on the modified image data on the display section.

The recording medium is a non-transitory computer-readable recording medium readable by a computer, wherein said computer program further comprises: a three-dimensional data generating step for causing the computer to generate three-dimensional image data for a preview image corresponding to stereoscopic viewing; and a step for causing the computer to display the preview image corresponding to the three-dimensional image data on the display section.

The display method according to the present invention is a display method, further comprising a three-dimensional data generating step for generating three-dimensional image data for a preview image corresponding to stereoscopic viewing.

In the present invention, when three-dimensional image data for the preview image is generated, the preview image based on the three-dimensional image data is displayed on the display section.

According to the present invention, it is possible to display a preview image representing more realistically an output, thereby improving the visibility for the user and enabling a display of a preview image adequate for a high-image-quality, high-resolution, high-performance image forming apparatus.

The above and further objects and features will more fully be apparent from the following detailed description with accompanying drawings.

DETAILED DESCRIPTION

The following description will explain an example in which a data processing apparatus and an image forming apparatus according to an embodiment of the present invention are a personal computer and a multi-function printer, respectively, which constitute an image forming system according to an embodiment of the present invention.

Embodiment 1

Figure 1:
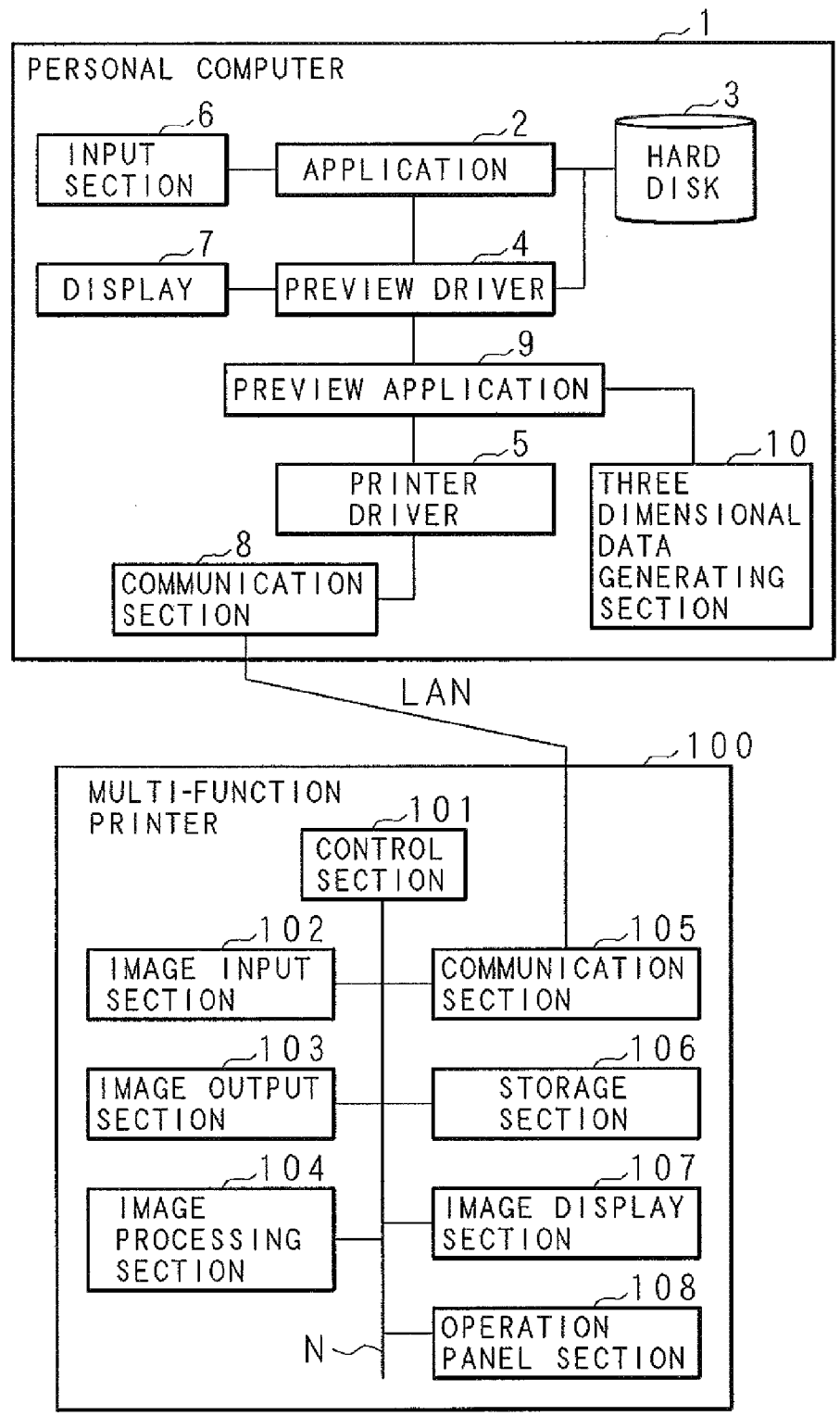
FIG. 1 is a functional block diagram for explaining essential configurations of a personal computer and a multi-function printer constituting an image forming system according to Embodiment 1 of the present invention.

FIG. 1 is a functional block diagram for explaining essential configurations of the personal computer and the multi-function printer constituting the image forming system according to Embodiment 1 of the present invention. For example, a personal computer 1 is connected to a multi-function printer 100 with a LAN, and the multi-function printer 100 forms an image based on data for a document (hereinafter referred to as the document data), which is created by the personal computer 1.

The personal computer 1 uses, for example, the Microsoft Windows operating system (OS) available from Microsoft Corporation. The personal computer 1 comprises: an application 2 (instruction receiving section); a hard disk 3; a preview driver 4; a preview application 9; a printer driver 5 (formation data generating section); an input section 6; a display 7; and a communication section 8.

The application 2 is an application program for providing text editing functions, such as word processing, paint, and presentation functions. Document data created on the application 2 is supplied to the preview driver 4 via an interface of the OS.

The input section 6 comprises, for example, a keyboard, a mouse etc. When creating document data on the application 2, data is inputted through the input section 6.

The display 7 is a liquid crystal display, for example, displays a preview image based on image data for a preview image created by the preview driver 4, and displays a setting receiving screen by the preview application 9.

The communication section 8 includes a network card, modem, etc. for sending, for example, document data, and later-described printing conditions (image forming conditions) and post-printing processing conditions (post-image-formation processing conditions) to the multi-function printer 100.

When the creation of document data on the application 2 is completed and an instruction for printing (image formation) is received from a user, the preview driver 4 is activated and generates image data for a preview image corresponding to the document data.

Figure 2:
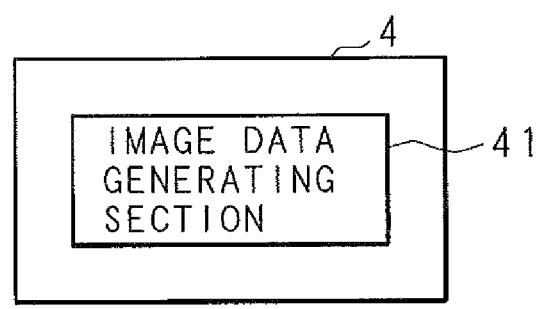
FIG. 2 is a functional block diagram illustrating an essential configuration of a preview driver of Embodiment 1 of the present invention.

FIG. 2 is a functional block diagram illustrating an essential configuration of the preview driver 4 of Embodiment 1 of the present invention. The preview driver 4 includes an image data generating section 41.

The image data generating section 41 generates image data for a preview image (intermediate file) on the basis of document data from the application 2 and information from the printer driver 5. The intermediate file is, for example, EMF (Enhanced Meta File) data for each page, and includes the document data and meta data (paper size, resolution and orientation) for printing the document data.

The preview application 9 (image display section) displays a preview image (or a three-dimensional view of a finished state) on the display 7 to assist the user of viewing a printed state and displays the setting receiving screen that is a user interface for receiving settings of printing conditions (for example, the number of copies, duplex/single-side printing, multiple pages per sheet printing, scaled printing, etc.) for printing based on document data, and post-printing processing conditions (such as binding and stapling) from the user, and receives the settings. Based on the received settings, the preview application 9 modifies the image data for a preview image, and displays a preview image based on the modified image data on the display 7. Further, the preview application 9 sends the document data and the printing conditions and post-printing processing conditions to the printer driver 5, and gives an instruction to send them to the multi-function printer 100.

The preview application 9 sends the intermediate file (EMF data) to, for example, Win32API which is drawing means provided by the OS, and causes Win32API to execute display and output of the EMF data in order to display the preview image based on image data generated by the image data generating section 41 on the display 7, and also displays the setting receiving screen on the display 7.

Figure 3:
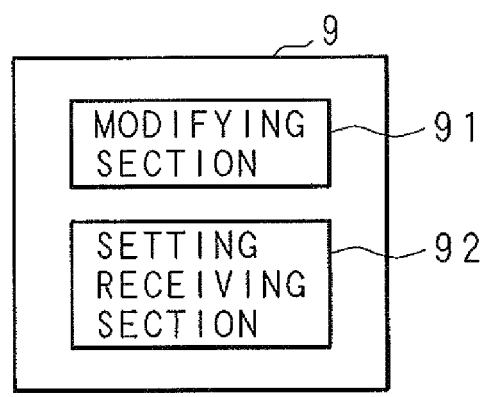
FIG. 3 is a functional block diagram illustrating an essential configuration of a preview application of Embodiment 1 of the present invention.

FIG. 3 is a functional block diagram illustrating an essential configuration of the preview application 9 of Embodiment 1 of the present invention. The preview application 9 includes a modifying section 91 and a setting receiving section 92.

The setting receiving section 92 receives the printing conditions and post-printing processing conditions through the setting receiving screen displayed on the display 7. When the setting receiving section 92 receives the printing conditions and post-printing processing conditions, the modifying section 91 modifies the image data for a preview image, which was already generated based on the document data from the application 2, according to the received printing conditions and post-printing processing conditions, so that a preview image based on the modified image data, namely, a preview image, which is reflected from the printing conditions and post-printing processing conditions, is displayed on the display 7.

When the setting receiving section 92 receives the printing conditions and post-printing processing conditions, the modifying section 91 modifies the image data for a preview image, which was already generated based on the document data from the application 2, according to the received printing conditions and post-printing processing conditions, on the preview application 9.

Thus, in the present invention, the preview image, which is reflected from both the printing conditions and the post-printing processing conditions, is immediately displayed, thereby improving the visibility for the user.

The preview application 9 sends to the printer driver 5 the printing conditions and post-printing processing conditions thus received by the setting receiving section 92, the document data, and EMF data including meta data about printing of the document data.

A three-dimensional data generating section 10 as a software module to be called from the preview application 9 is connected to the preview application 9. The three-dimensional data generating section 10 generates three-dimensional image data for a preview image corresponding to a user's stereoscopic viewing. When the three-dimensional data generating section 10 receives an instruction through the setting receiving screen to three-dimensionally display a finished state as to be described later, it generates the three-dimensional image data based on the document data supplied from the application 2.

As a general method to convert image data for a preview image (intermediate file) into a three-dimensional image, for example, a plane figure projective (projection) transformation technique is disclosed (Japanese Patent Application Laid-Open No. H11-312238 (1999)). In the configuration of the present invention, each page image in the intermediate file is virtually arranged at a given position and angle, and projective transformation is performed on the virtually arranged each page image to transform it into a three-dimensional preview image. Such a process is performed by the three-dimensional data generating section 10, and three-dimensional preview images illustrated in FIGS. 5 and 6, for example, are acquired.

The printer driver 5 converts the EMF data (intermediate file) acquired from the preview application 9 into data (image formation data) of a type (PCL) capable of being processed for printing by the multi-function printer 100, and sends the resulting data to the multi-function printer 100. The multi-function printer 100 receives the PCL type data, and prints an image based on the document data on a sheet according to the printing conditions and post-printing processing conditions.

On the other side, the multi-function printer 100 comprises: an image input section 102; an image output section 103 (image forming section); an image processing section 104; a communication section 105 (acquiring section); an image display section 107; a storage section 106 (storing section); and an operation panel 108. These hardware devices are connected to a control section 101 by a bus N.

The image input section 102 comprises: a light source for irradiating light on a document to be read; and an image sensor such as a CCD (Charge Coupled Device), and optically reads image data of the document. In the image input section 102, a reflected light image from a document set on a given read place is focused onto the image sensor, and RGB (R: Red, G: Green, B: Blue) analog data are outputted.

The image output section 103 prints an image based on image data outputted from the image processing section 104 on a sheet of recording paper, an OHP film, etc. The image output section 103 comprises: a photosensitive drum; a charger for charging the photosensitive drum to a given electric potential; a laser writer for generating an electrostatic latent image on the photosensitive drum by emitting laser light according to image data received from an external device; a developing device for supplying toner to the electrostatic latent image formed on the photosensitive drum surface to visualize the image; and a transfer device for transferring the toner image formed on the photosensitive drum surface to a sheet, and, for example, forms the image on the sheet by an electro-photographic method.

The communication section 105 includes a network card, a modem, etc. for receiving (acquiring) the document data and the printing conditions and post-printing processing conditions from an external device such as the personal computer 1, and sends image data after being processed by the image processing section 104 to an external device via the network card, modem, etc. as an example.

The storage section 106 is a non-volatile semiconductor memory such as a hard disk and stores image data of a document acquired through the image input section 102, or document data received from the personal computer 1 through the communication section 105.

The operation panel 108 includes: function buttons for switching functions, such as "Fax", "Copy", "Print", and "Mail", of the digital multi-function printer 100; ten-key; the Enter key for entering a received instruction; and the "Output" key or the "Copy" key for forming an image of a document read by the image input section 102 on a sheet.

The image display section 107 is composed of a liquid crystal display as an example, and displays information to be reported to the user, such as the status of the multi-function printer 100, the status of a job processing, the image of a document read by the image input section 102, and the confirmation of the content of operation of the operation panel 108.

The image processing section 104 generates digital image data on the basis of analog data inputted from the image input section 102 as an example, or it retrieves image data stored in the storage section 106, performs processing according to the type of each image, and then generates output image data (for image formation). The output image data generated by the image processing section 104 is outputted to the image output section 103, or the communication section 105.

The control section 101 comprises a CPU, a ROM, and a RAM (not shown). The ROM stores various kinds of control programs, data, etc. in advance. The RAM is capable of storing data temporarily and allows the data to be read regardless of the order and place they are stored. The RAM stores, for example, a program read from the ROM, various kinds of data generated by the execution of the programs, and various kinds of data received from external devices.

Figure 4:
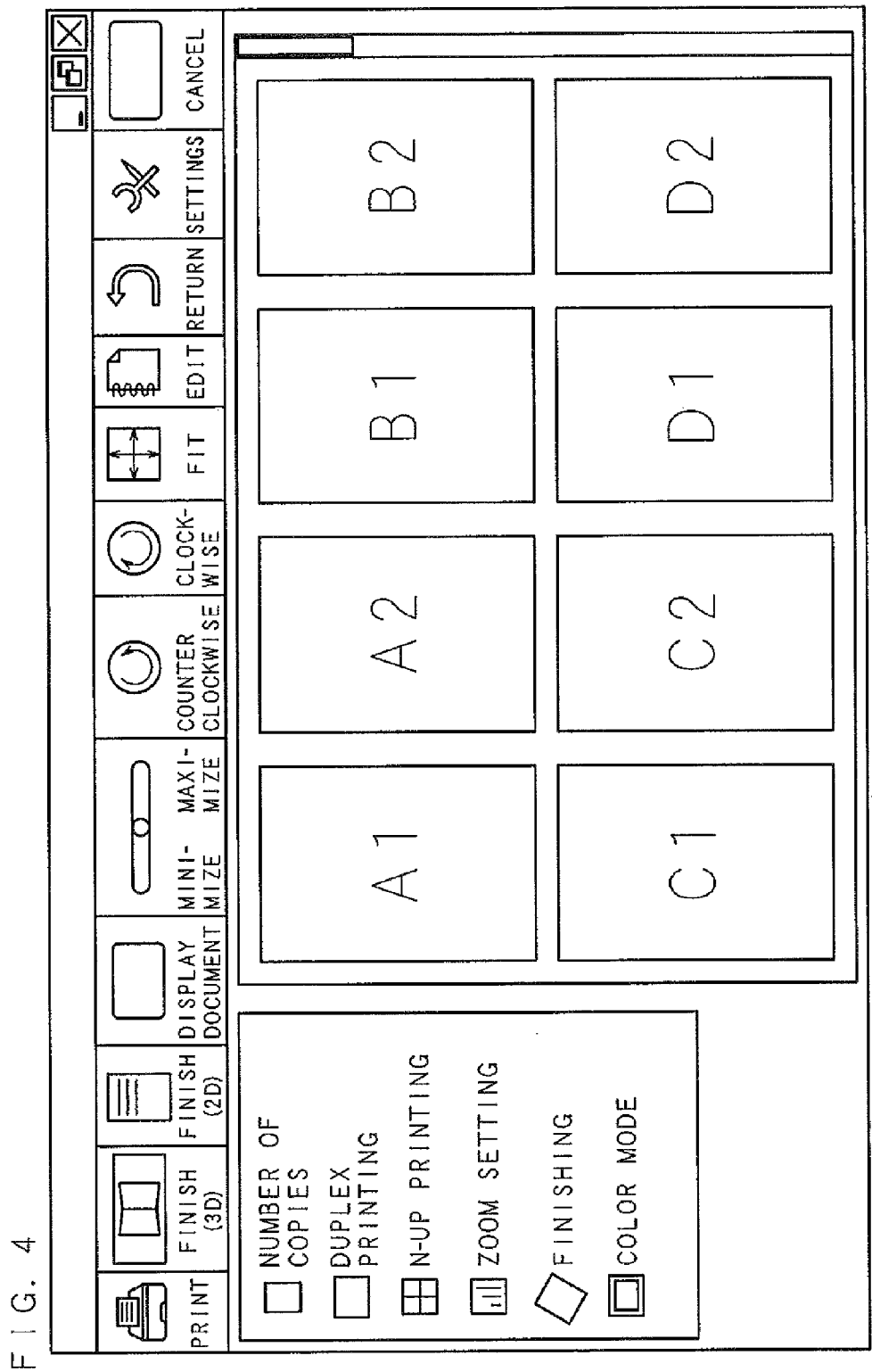
FIG. 4 is an exemplary view illustrating one example of a display of preview images and the setting receiving screen of Embodiment 1 of the present invention.

FIG. 4 is an exemplary view illustrating one example of a display of preview images and the setting receiving screen of Embodiment 1 of the present invention. Although not confirmed on FIG. 4, since the preview images are displayed based on image data for the preview images, the present invention allows the user to confirm more details compared to a conventional simplified preview image formed using document data, thereby further improving the visibility for the user and enabling a display of a preview image adequate for a high-image-quality, high-resolution, high-performance image forming apparatus.

The setting receiving screen includes soft buttons for receiving settings of printing conditions and post-printing processing conditions, such as the "Number of copies", "Duplex printing", and "Finishing". When the user suitably operates these soft buttons, the setting receiving section 92 receives the printing conditions and post-printing processing conditions through the setting receiving screen. For example, the user operates the "Duplex printing" soft button and selects duplex printing or single-sided printing to set a printing condition, and operates the "Finishing" soft button to set a post-printing processing condition, such as right-side binding and left-side binding.

Further, the setting receiving screen includes "Finishing (three dimensional)" and "Finishing (two dimensional)" soft buttons. For example, after setting given printing conditions and post-printing processing conditions, when these soft buttons are operated, preview images, which are reflected from the printing conditions and post-printing processing conditions, are three-dimensionally or two-dimensionally displayed.

Figure 5:
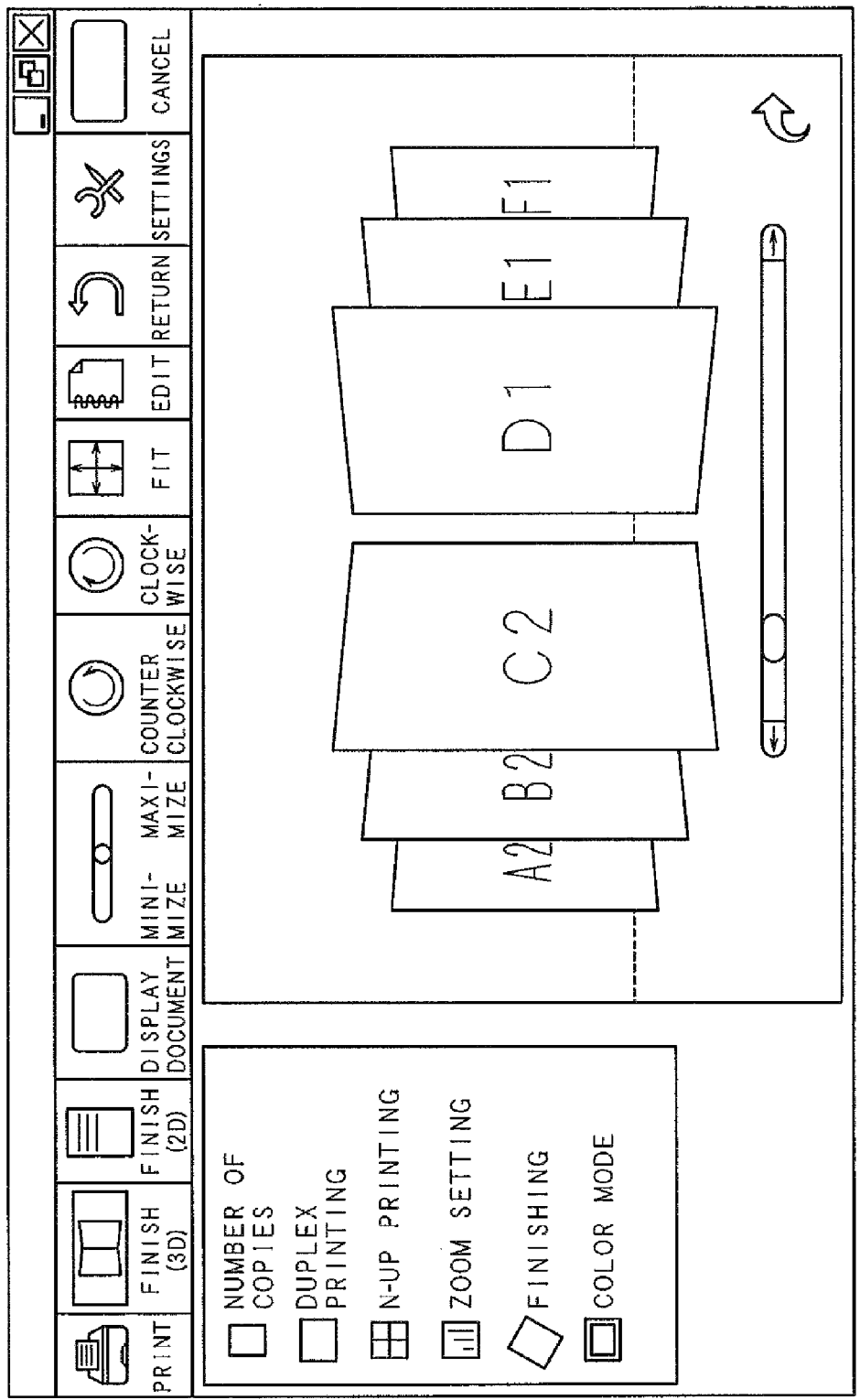
FIG. 5 is an exemplary view illustrating one example of three-dimensionally displaying the finished state as preview images in Embodiment 1 of the present invention.

For instance, when the user operates the "Finishing (three dimensional)" soft button, the setting receiving section 92 receives an instruction to three-dimensionally display a finished state in which the received printing conditions and post-printing processing conditions are reflected. At this time, the three-dimensional data generating section 10 modifies the already generated image data for the preview image, based on the printing conditions and post-printing processing conditions, according to a call from the preview application 9, and generates new three-dimensional image data for the preview image, so that the preview image corresponding to a user's stereoscopic vision is displayed based on the three-dimensional image data on the display 7. FIG. 5 is an exemplary view illustrating one example of three-dimensionally displaying the finished state as preview images in Embodiment 1 of the present invention. Since the finished state is three-dimensionally displayed, the user is able to confirm the image on the basis of a more realistic output result. Moreover, since the finished state is three-dimensionally displayed, the user is able to confirm the relationship between the front side and back side at a glance when the images are printed by duplex printing.

Figure 6:
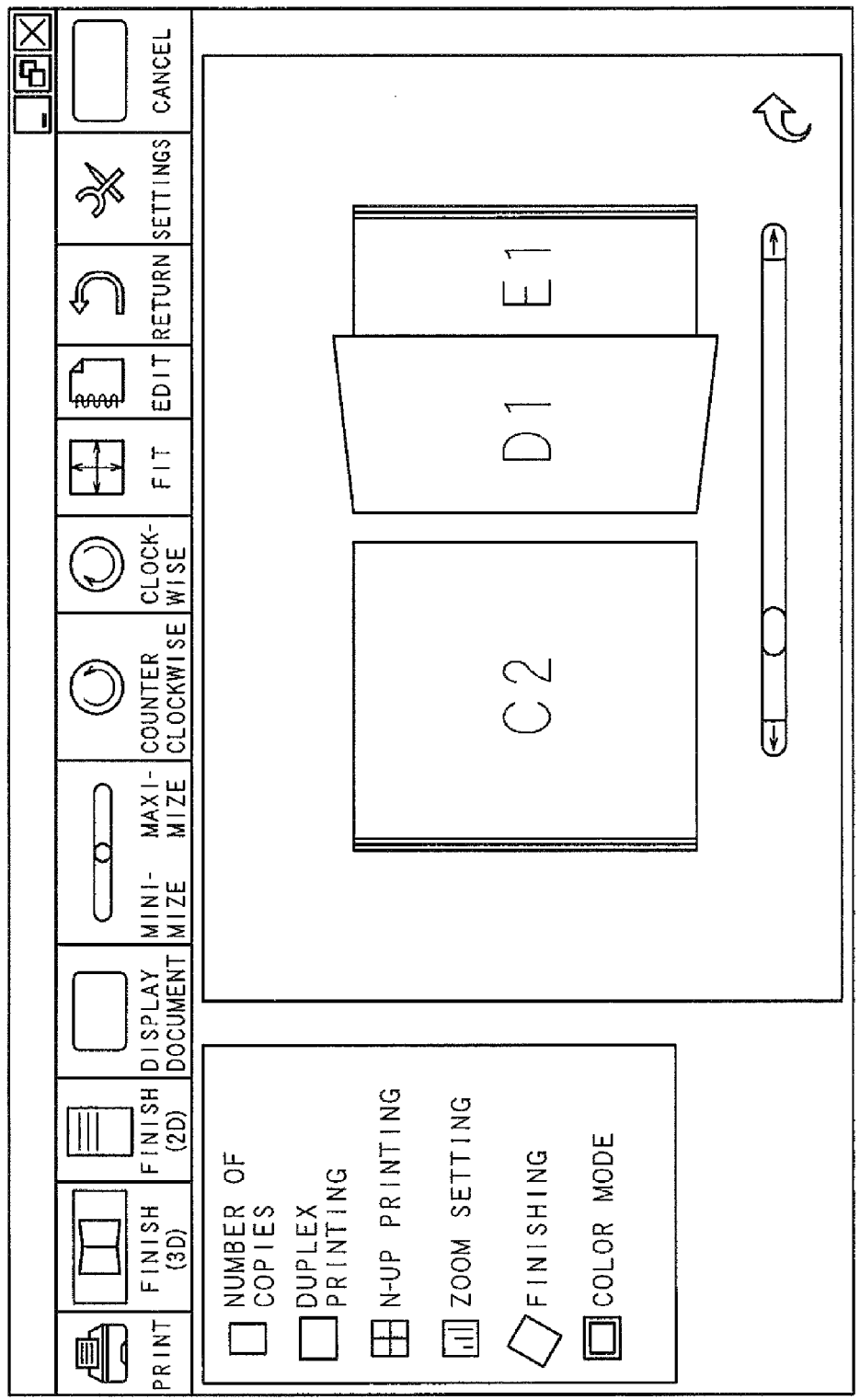
FIG. 6 is an exemplary view illustrating one example of two-dimensionally displaying the finished state as preview images in Embodiment 1 of the present invention.

On the other hand, when the user operates the "Finishing (two dimensional)" soft button, the setting receiving section 92 receives an instruction to two-dimensionally display a finished state in which the received printing conditions and post-printing processing conditions (for example, making holes) are reflected. FIG. 6 is an exemplary view illustrating one example of two-dimensionally displaying the finished state as preview images in Embodiment 1 of the present invention.

Figure 7:
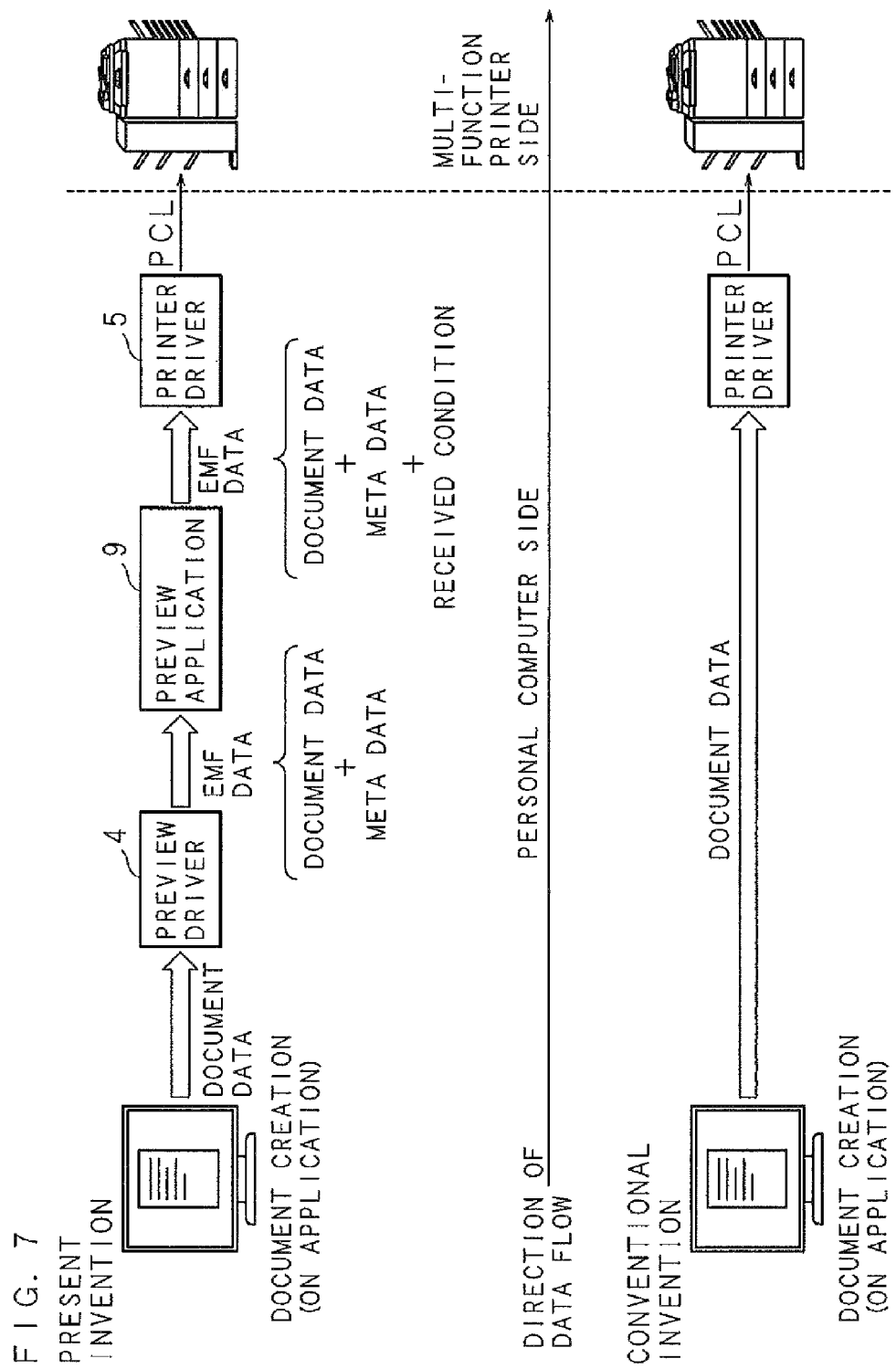
FIG. 7 is a comparative view for comparing an image forming system according to the present invention with a conventional image forming system.

FIG. 7 is a comparative view for comparing an image forming system according to the present invention with a conventional image forming system.

In the conventional image forming system, a document is created on an application on a personal computer. When an instruction to print the document data is given, the printer driver is activated and a user interface is displayed on the display section, and a simplified preview image is created from the document data and displayed. Settings of printing conditions and post-printing processing conditions are received through the user interface, a simplified preview image, which is reflected from only the printing conditions, is displayed, and printing data for the document data and the received printing conditions and post-printing processing conditions are converted into PCL type data and sent to the multi-function printer.

On the other hand, in the image forming system according to the present invention, when a document is created on an application on a personal computer and an instruction to print the document data is given, the printer driver is activated and image data for a preview image (EMF data) corresponding to the document data is generated. The EMF data includes the document data and meta data. Next, a preview application is activated, a user interface is displayed on the display section, and a more realistic preview image is created based on the EMF data and displayed. The preview application receives settings of printing conditions and post-printing processing conditions through the user interface, modifies the image data for a preview image on the preview application, according to the printing conditions and post-printing processing conditions, and displays two-dimensionally or three-dimensionally more realistic preview images in which the printing conditions and post-printing processing conditions are reflected. Thereafter, the preview application sends the document data together with the received printing conditions and post-printing processing conditions to the printer driver. Then, the printer driver converts the data into PCL type data and sends them to the multi-function printer. Thus, it is not necessary to regenerate the image data for a preview image and the printing data every time a modification is made to the printing conditions and post-printing processing conditions, the modification in the printing conditions and post-printing processing conditions are promptly reflected on the preview image, a preview image matching the output image is displayed, and the effect of reducing the processing burden on the printer driver compared to the conventional image formation system is acquired.

Figure 8:
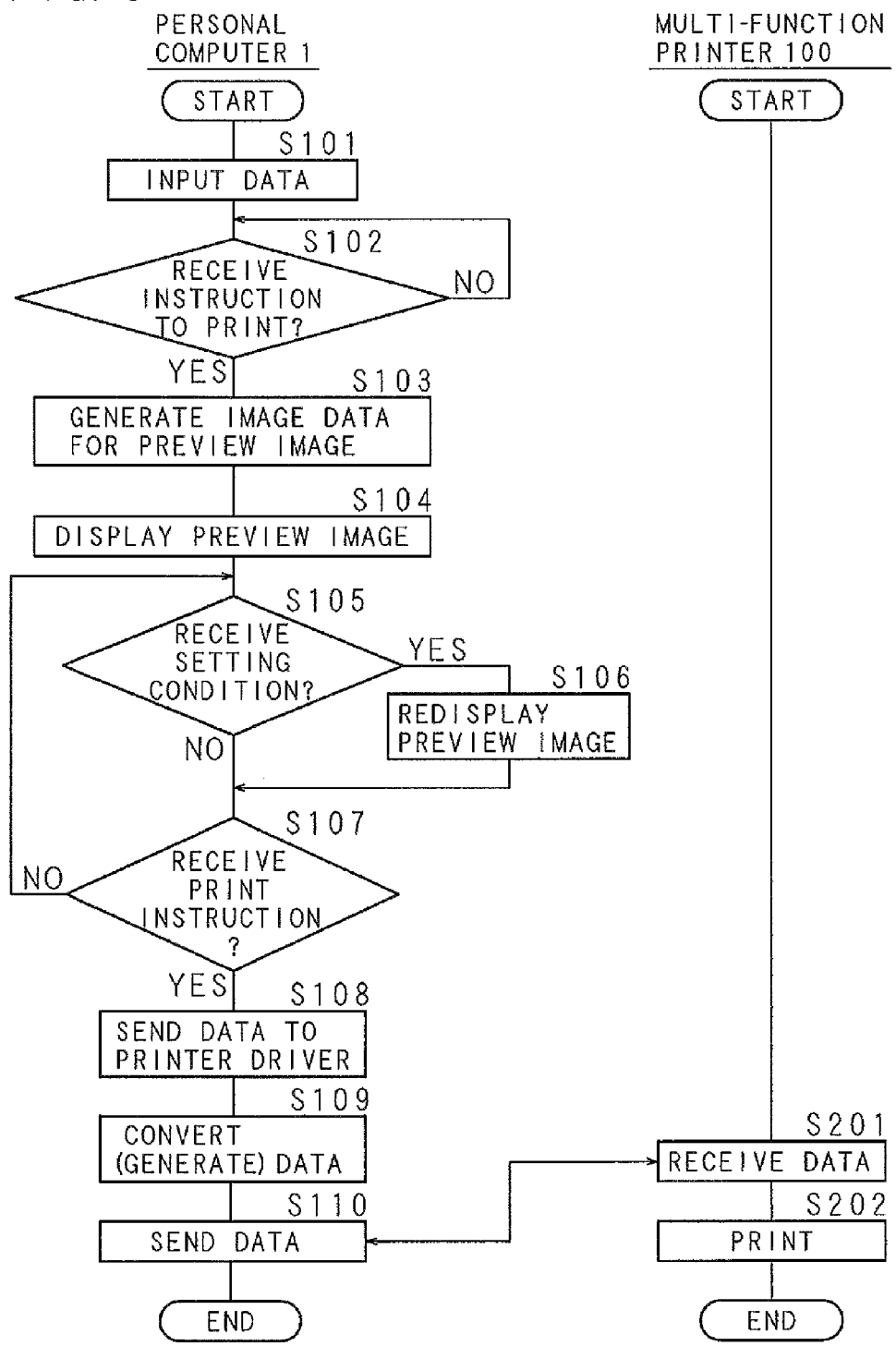
FIG. 8 is a flowchart illustrating one example of a printing (image formation) process in the image forming system according to Embodiment 1 of the present invention.

FIG. 8 is a flowchart illustrating one example of a printing (image formation) process in the image forming system according to Embodiment 1 of the present invention.

For example, data is inputted through the input section 6 by the user operating the input section 6 of the personal computer 1 (step S101). Based on the inputted data, a document is created on the application 2.

Based on a signal from the input section 6, coordinates on the screen of the display 7, etc., the application 2 determines whether or not an instruction to print the document is received (step S102).

For instance, when the user is still creating a document, an instruction to print the document is not received, and therefore the application 2 determines that an instruction to print the document is not received (step S102: NO), and waits until it receives a print instruction.

On the other hand, when the user finished the creation of a document and gave an instruction to print the document by operating the keyboard or the mouse, the application 2 determines that an instruction to print the document is received (step S102: YES), and the preview driver 4 is activated.

Based on the document data from the application 2 and information from the printer driver 5, the preview driver 4 (image data generating section 41) generates image data (EMF data) for a preview image corresponding to the document (step S103). The EMF data includes the document data and meta data about printing of the document data. At this time, the preview application 9 is activated, and the setting receiving screen is displayed on the display 7.

The preview application 9 displays on the display 7 a preview image based on the image data generated by the image data generating section 41 by the above-mentioned method (step S104).

For example, as illustrated in the example of FIG. 4, after the preview image is displayed, the user sets printing conditions and post-printing processing conditions by suitably operating the soft buttons on the left side of the setting receiving screen shown in FIG. 4.

At this time, the preview application 9 monitors the operation of the soft buttons on the setting receiving screen to determine whether or not the printing conditions and post-printing processing conditions are received (step S105).

When the preview application 9 determines that the printing conditions and post-printing processing conditions are received (step S105: YES), it (the modifying section 91) modifies the already generated image data for the preview image according to the received printing conditions and post-printing processing conditions, and redisplays a preview image based on the newly modified image data for the preview image, that is, a preview image in which the printing conditions and post-printing processing conditions are reflected (step S106). Thereafter, the processing proceeds to step S107.

On the other hand, when the preview application 9 determines that the printing conditions and post-printing processing conditions are not received (step S105: NO), it determines, based on the signal from the input section 6, coordinates on the screen of the display 7, etc., whether or not an instruction to print the document is received (step S107). In other words, the preview application 9 determines whether or not an instruction to print the document is received by monitoring whether or not the "Print" soft button on the upper left side in FIG. 4 is operated.

When the preview application 9 determines that a print instruction for a document is not received (step S107: NO), the processing returns to step S105. On the other hand, when the user operated the keyboard or the mouse to give an instruction to print the document, the preview application 9 determines that a print instruction is received (step S107: YES), and sends printing data (EMF data) to the printer driver 5 (step S108). The printing data includes the document data, meta data about printing of the document data, and the received printing conditions and post-printing processing conditions.

After the printer driver 5 acquired the printing data from the preview application 9, it converts the data into (generates) PCL type data (data for image formation) so that the corresponding multi-function printer 100 recognizes the data (step S109).

Next, the printer driver 5 sends the PCL type data to the multi-function printer 100 through the communication section 8 (step S110).

The control section 101 of the multi-function printer 100 receives the PCL type data through the communication section 105 (step S201), and gives the image output section 103 an instruction to perform printing based on the received PCL type data. The image output section 103 prints an image corresponding to the document on a sheet according to the instruction from the control section 101 (step S202).

Embodiment 2

Figure 9:
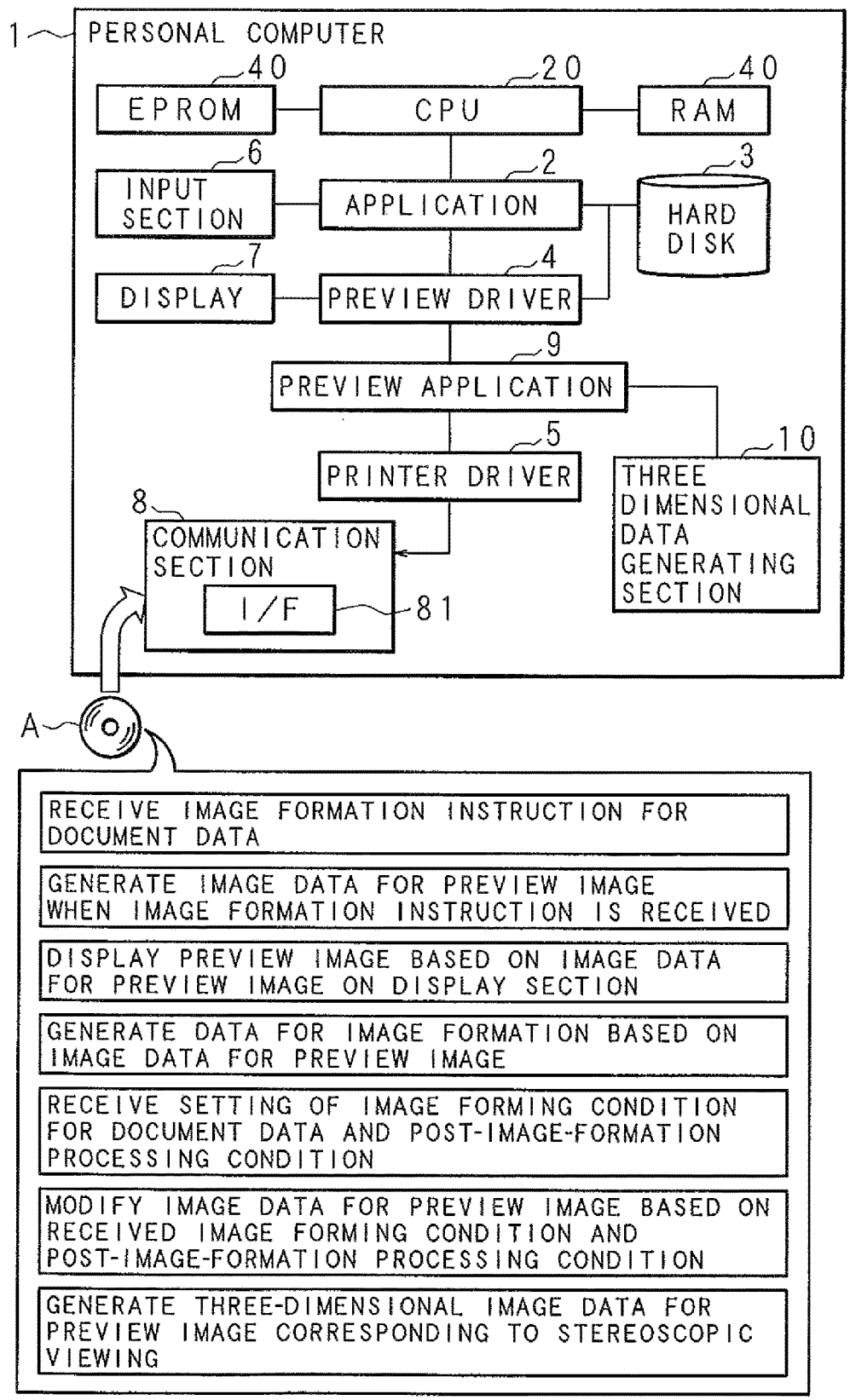
FIG. 9 is a functional block diagram illustrating an essential configuration of a personal computer according to Embodiment 2 of the present invention.

FIG. 9 is a functional block diagram illustrating an essential configuration of a personal computer 1 according to Embodiment 2 of the present invention. The personal computer 1 of Embodiment 2 is configured so that a computer program for operations is capable of being provided by a recording medium, such as a CD-ROM, through an I/F 81. Moreover, the personal computer 1 of Embodiment 2 is configured so that the computer program is capable of being downloaded from an external device (not shown) through a communication section 8. The contents will be explained below.

The personal computer 1 of Embodiment 2 comprises an external (or internal) recording medium reader (not shown). A removable recording medium A, which stores a program for receiving an image formation instruction for document data, generating image data for a preview image when the image formation instruction is received, displaying a preview image based on the image data for the preview image on a display section, generating data for image formation based on the image data for the preview image, receiving settings of image forming conditions for the document data and post-image-formation processing conditions, modifying the image data for the preview image based on the received image forming conditions and post-image-formation processing conditions, and generating a three-dimensional image data for a preview image corresponding to stereoscopic viewing, is inserted into the recording medium reader device, and, for example, a CPU 20 installs the program in an EPROM 40. The program is loaded in a RAM 30 and executed. Consequently, it functions as the personal computer 1 of Embodiment 1 of the present invention.

The recording medium may be a so-called program medium, or a medium carrying program codes in a fixed manner, such as tapes including a magnetic tape and a cassette tape, disks including magnetic disks such as a flexible disk and a hard disk, and optical disks such as a CD-ROM, MO, MD, and DVD, cards such as an IC card (including a memory card) and an optical card, or semiconductor memory such as a mask ROM, an EPROM, an EEPROM, and a flash ROM.

Or the recording medium is a recording medium carrying program codes in a flowing manner like downloading the program codes from a network through the communication section 8. In the case where the program is downloaded from a communication network in such a manner, a program for downloading is stored in the main apparatus in advance, or installed from a different recording medium. Note that the present invention is also implemented in the form of a computer data signal embedded in a carrier wave in which the program codes are embodied by an electronic transfer.

The same parts as in Embodiment 1 are designated with the same reference numbers, and detailed explanations thereof will be omitted.

As this description may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An image forming system including a data processing apparatus that creates document data for an image to be formed and displays a preview image corresponding to the document data on a display, and an image forming apparatus that forms an image based on data acquired, wherein
the data processing apparatus comprises:
an image data generator that generates image data for the preview image;
a setting receiver that sets post-image-formation processing conditions for the document data;
an image modifier that modifies the image data for the preview image, according to the post-image-formation processing conditions received by the setting receiver; and
an image display that three-dimensionally displays the preview image on the display which shows two predetermined page images such that an entire image on each of the two predetermined page images is displayed and shows another page image partially screened by one of the two predetermined page images, according to the image data generated by the image data generator or the image data modified by the image modifier, and
the image forming apparatus comprises:
an acquirer that acquires the data acquired for image formation from the data processing apparatus; and
an image former that forms an image based on the acquired data for image formation.

2. The image forming system according to claim 1, wherein
the setting receiver receives image forming conditions for the document data;
the image modifier modifies the image data for the preview image, according to the image forming conditions and the post-image-formation processing conditions received by the setting receiver; and
a preview image is displayed based on the modified image data from the image modifier on the display.

3. The image forming system according to claim 2, wherein the data processing apparatus further comprises a three-dimensional data generator that generates three-dimensional image data for the preview image corresponding to stereoscopic viewing.

4. The image forming system according to claim 3, wherein a formation data generator generates data for image formation including the image forming conditions and the post-image-formation processing conditions, according to an instruction from the display.

5. The image forming system according to claim 1, wherein
the data processing apparatus further comprises:
an instruction receiver that receives an instruction to display another two page images instead of the two predetermined page images on the display.

6. A data processing apparatus that creates document data for an image to be formed and displays a preview image corresponding to the document data on a display, the data processing apparatus comprising:
an image data generator that generates image data for the preview image;
a setting receiver that receives post-image-formation processing conditions for the document data;
an image modifier that modifies the image data for the preview image, according to the post-image-formation processing conditions received by the setting receiver; and
an image display that three-dimensionally displays the preview image on the display which shows two predetermined page images such that an entire image on each of the two predetermined page images is displayed and shows another page image partially screened by one of the two predetermined page images, according to the image data generated by the image data generator or the image data modified by the image modifier.

7. The data processing apparatus according to claim 6, wherein the setting receiver receives image forming conditions for the document data;
the image modifier modifies the image data for the preview image, according to the image forming conditions and the post-image-formation processing conditions received by the setting receiver; and
a preview image is displayed based on the modified image data from the image modifier on the display.

8. The data processing apparatus according to claim 7, further comprising a three-dimensional data generator that generates three-dimensional image data for the preview image corresponding to stereoscopic viewing.

9. The data processing apparatus according to claim 8, wherein
a formation data generator generates data for image formation including the image forming conditions and the post-image-formation processing conditions, according to an instruction from the image display.

10. An image forming apparatus comprising:
the data processing apparatus as set forth in claim 7; and
an image former that forms an image based on the document data created by the data processing apparatus on a sheet.

11. The data processing apparatus according to claim 6, further comprising:
an instruction receiver that receives an instruction to display another two page images instead of the two predetermined page images on the display.

12. A non-transitory computer-readable recording medium readable by a computer and storing a computer program that causes the computer constituting a data processing apparatus, which includes a display and creates document data for an image to be formed, to perform a method of displaying a preview image corresponding to the document data, the method comprising:
causing the computer to generate image data for the preview image;
causing the computer to receive post-image-formation processing conditions for the document data;
causing the computer to modify the image data for the preview image, according to the post-image-formation processing conditions received in the receiving step; and
causing the computer to three-dimensionally display the preview image on the display which shows two predetermined page images such that an entire image on each of the two predetermined page images is displayed and shows another page image partially screened by one of the two predetermined page images, according to the image data generated in the image data generating step or the image data modified in the modifying step.

13. The non-transitory computer-readable recording medium readable by the computer according to claim 12, wherein the method further comprises:
causing the computer to receive image forming conditions for the document data;

causing the computer to modify the image data for the preview image, according to the received image forming conditions and the received post-image-formation processing conditions, and causing the computer to display the preview image based on the modified image data on the display.

14. The non-transitory computer-readable recording medium readable by the computer according to claim 13, wherein the method further comprises:

causing the computer to generate three-dimensional image data for the preview image corresponding to stereoscopic viewing; and causing the computer to display the preview image corresponding to the three-dimensional image data on the display.

15. The non-transitory computer-readable recording medium readable by the computer according to claim 12, wherein the method further comprises:

causing the computer to receive an instruction to display another two page images instead of the two predetermined page images on the display.

16. A display method for use with a data processing apparatus, which includes a display and creates document data for an image to be formed, to display a preview image corresponding to the document data, the display method comprising:

generating image data for the preview image;

receiving post-image-formation processing conditions for the document data;

modifying the image data for the preview image, according to the post-image-formation processing conditions received in the receiving step; and displaying the preview image on the display three-dimensionally which shows a two predetermined page images such that an entire image on each of the two predetermined page images is displayed and shows another page image partially screened by one of the two predetermined page images, according to the image data generated in the image data generating step or the image data modified in the modifying step.

17. The display method according to claim 16, further comprising:

receiving image forming conditions for the document data;

modifying the image data for the preview image, according to the received image forming conditions and the received post-image-formation processing conditions, and displaying the preview image based on the modified image data on the display.

18. The display method according to claim 17, further comprising:

generating three-dimensional image data for the preview image corresponding to stereoscopic viewing; and displaying the preview image corresponding to the three-dimensional image data on the display.

19. The display method according to claim 16, further comprising:

receiving an instruction to display another two page images instead of the two predetermined page images on the display.

* * * * *